Feb. 13, 1968  R. J. ZELINSKI  3,368,746
AIR DEFLECTOR FOR IMPROVED COOLING OF FAN MOTOR
Filed Dec. 6, 1965
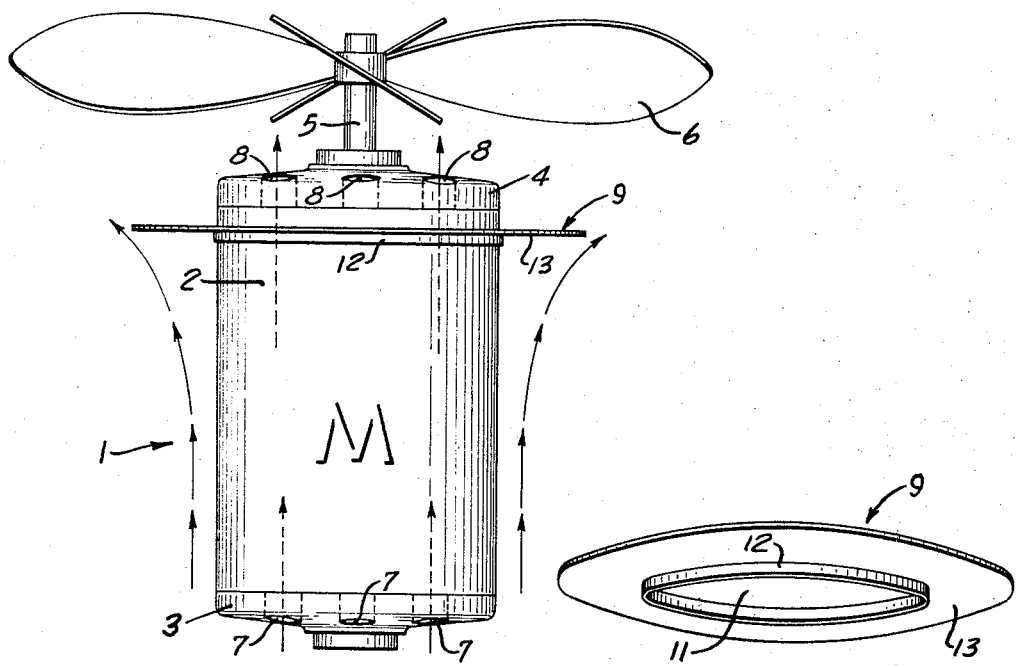
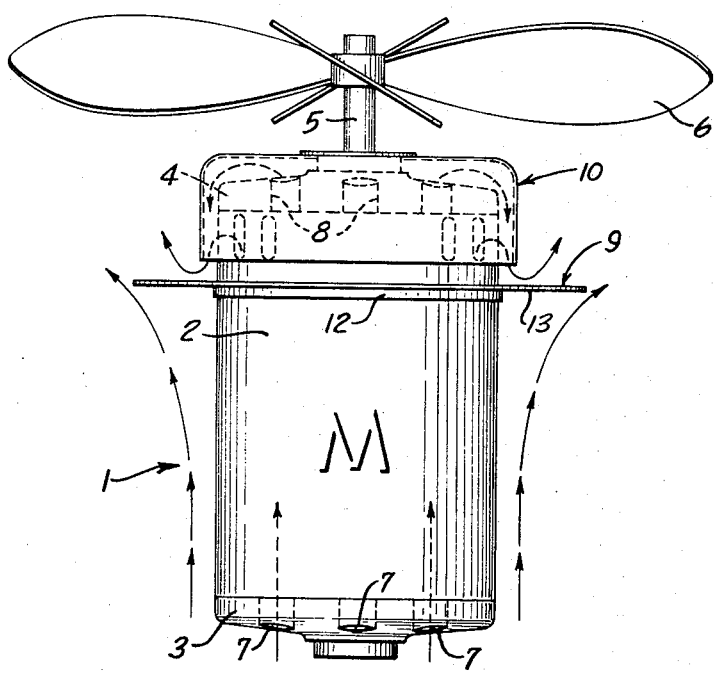
INVENTOR
ROBERT J. ZELINSKI
BY
Howard J. Barnett
ATTORNEY

United States Patent Office 3,368,746
Patented Feb. 13, 1968

3,368,746
AIR DEFLECTOR FOR IMPROVED COOLING
OF FAN MOTOR
Robert J. Zelinski, Vandalia, Ohio, assignor to A. O. Smith
Corporation, Milwaukee, Wis., a corporation of New
York
Filed Dec. 6, 1965, Ser. No. 512,278
5 Claims. (Cl. 230—259)

ABSTRACT OF THE DISCLOSURE

This invention relates to an annular, flat air deflector ring which is press fitted about a fan motor housing. The motor includes multiple ventilating openings in the forward and rear end bells or frames secured to the motor housing, through which the air impelled by the fan rotor is allowed to pass, thus cooling the motor components. The ring extends radially outwardly from the housing in a perpendicular fashion and forms a part of a fan motor whereby a single air source is employed to provide the fan output and the cooling system of the motor. A protective canopy may be disposed over the forward end of the motor.

The present invention is directed to an annular air deflector ring which is adapted to fit around the main frame of an air cooled fan motor to improve the ventilation efficiency by substantially increasing the volume of air drawn through the motor.

Fan motors in ventilation systems must operate over long periods of time at low torque. It is very important that maximum cooling of the motor be obtained to maintain a stable operating temperature and to avoid overheating and eventual destruction of the motor windings.

Various proposals have been made in the past, including the incorporation of separate cooling fans inside the motor, such as is shown in U.S. Patent 1,819,182. This motor also shows heat conduction fins 10a for heat conduction cooling, but the fins are not arranged to increase the flow of cooling air through the windings of the motor in the manner of the air deflector ring of applicant's invention.

The motor ventilation problem becomes particularly severe in outdoor applications in which the fan motor must be protected by a metal canopy from the weather. Such a canopy is shown in U.S. Patent 2,228,116. In an apparatus of this type, the canopy severely hampers the cooling of the motor by diverting the ventilating air away from the most desirable flow path. In addition, the air deflected by the canopy "bucks" the main air flow, creating turbulence, and further decreasing the cooling efficiency of the internal ventilating system of the motor. The air deflector ring of the invention eliminates the irregular air flow path and turbulence by guiding the air exhausted from the motor to a path perpendicular to the main air flow path.

This invention solves the cooling problem for air cooled fan motors in a unique and direct manner. A much larger volume of the main air flow created by the main fan is caused to flow through the windings of the motor by the addition of the air deflector ring of the invention. The deflector ring may be applied to a motor having an internal ventilating system comprising intake-exhaust fans which pull air through the motor, as well as to a fan motor having only internal air flow paths without an internal air impeller system.

In the drawing:

FIGURE 1 is a side elevation showing the air deflector ring applied to a fan motor having only air passages extending through the motor, and having no internal fans or canopy;

FIG. 2 is a side elevation showing the deflector ring applied to a fan motor having an internal ventilating system and a canopy for outdoor protection from weather; and FIG. 3 is a perspective view of the air deflector ring of the invention.

As shown in the drawings, a motor 1, having a main frame 2 and a pair of end frames 3 and 4, is operably connected through a motor shaft 5 to rotate a large ventilating fan 6. The end frames 3 and 4 are provided with a plurality of ventilating openings 7 and 8, respectively, to allow cooling air to pass over the motor windings disposed inside the main frame 2.

As shown in the drawing, a motor 1, having a main ring 9 is disposed around the main frame 2 to deflect air away from the outside of the main frame 2 of the motor 1. In the embodiment shown in FIG. 1, the main effect of the deflector ring 9 is to create a pressure differential between the inlet ventilating openings 7 and the outlet ventilating openings 8 so that a greater volume of cooling air will pass over the motor windings during a specified unit of time.

As shown in FIG. 2, the deflector ring 9 serves the additional function of directing the air exhaust from the motor 1 away from the opposite direction of the main fan air flow, thereby eliminating excessive air turbulence which would otherwise be caused by opposed air flows, one air flow being reversed to an opposed direction by a protective motor canopy 10.

As can be best seen in FIG. 3, the air deflector ring 9 presently comprises an annular member having a central opening 11, a cylindrical flange 12 and a flat, larger flange 13 extending perpendicularly out from the flange 12 and integral therewith. As shown in the drawings, the cylindrical flange 12 is substantially equivalent in diameter to the outer diameter of the motor main frame 2, so that the air deflector ring can be press-fit on main frame 2 intermediate the end frames 7 and 8.

The invention has been used in combination with a 1½ H.P. A.C. induction fan motor having a canopy. A ¾" annular flange deflector ring was employed, having an outer diameter of approximately 7⅞". When the operating temperature was compared to the operating temperature of the same motor *without* the deflector ring 9, it was discovered that the operating temperature was dropped by about 10° C. from about a 70° C. rise.

This invention provides an improved cooling air deflector system for a ventilating fan motor by increasing the volume of cooling air passing over the motor winding. The deflector ring may be applied to a fan motor, with or without an internal ventilating system, and to motors with or without external weather protective canopies.

Various modes of carrying out the invention are contemplated as being within the scope of the following claims particularly pointing out and distinctly claiming the subject matter which is regarded as the invention.

I claim:
1. In an air cooled fan motor driving a rotating fan and having a forward and a rear end, said fan having a plurality of fan blades disposed on a motor shaft extending from the forward end of the motor and operating to impel an air stream from the rear end of the motor over the motor to define an air output stream; a generally cylindrical motor housing main frame; a pair of end frames, one on each end of the motor housing and each having a plurality of openings in communication with the housing which allows air to pass coaxially over the internal motor components; and an annular air deflector ring fitted around the motor housing to divide the single air stream at the rear end of the motor into a pair of air streams, one of which passes through the motor and the other of which passes over the motor.

2. The structure of claim 1 wherein: the annular deflector ring includes an inner ring member of generally cylindrical shape defining an opening corresponding in diameter to the outer diameter of the motor housing and a flat, annular flange member attached around the outer circumference of the ring member and extending perpendicularly outward therefrom; and the air deflector ring is spaced adjacent to the end frame on the forward end of the motor.

3. In an air cooled fan motor driving a plurality of fan blades disposed on a motor shaft extending from the forward end of the motor and having passageway means for passing an air stream over the motor components; a canopy member disposed to cover the forward end of the fan motor and extending outwardly into the path of said air stream, said air being deflected generally backwardly by the canopy; and an air deflector ring disposed around the main frame and spaced adjacent the canopy in a direction towards the opposite end of the fan motor, the deflector serving to redirect toward the forward end, the air deflected by the canopy.

4. The structure of claim 3 wherein the motor includes a tubular main frame and a first end frame attached on the forward end of the main frame and a second end frame attached on the opposite end, each end frame having openings communicating with the interior of the main frame for passing air over the internal motor components; and the air deflector ring is a generally flat member extending outwardly from the main frame in a direction generally perpendicular to the direction of the air flow around the fan motor.

5. The structure of claim 4 wherein: the main frame is a generally cylindrical motor housing; the canopy member comprises a generally cylindrical canopy frame of diameter larger than the diameter of the motor housing and a canopy cap generally enclosing the canopy end nearest the fan blades, and has an opening through which the motor shaft extends, the opposite end of the canopy being open; the air deflector ring is disposed on the cylindrical motor housing on the forward end of the motor and adjacent to the open end of the canopy; and the air deflector ring extends radially outward from the motor housing for a distance beyond the outer diameter of the canopy; whereby air passing coaxially through the motor and being deflected backwardly by the canopy is generally redirected to less than a 90° divergence from the direction of flow of the main air stream.

References Cited
UNITED STATES PATENTS

| | | | |
|---|---|---|---|
| 1,996,460 | 4/1935 | Coates | 230—117 |
| 2,193,408 | 3/1940 | Knight | 230—117 |
| 2,293,508 | 8/1942 | Killam | 230—117 |
| 2,516,184 | 7/1950 | Christie | 230—117 |
| 2,661,146 | 12/1953 | Hill et al. | 230—117 |
| 2,956,731 | 10/1960 | Bayuk et al. | 230—120 |

HENRY F. RADUAZO, *Primary Examiner.*